United States Patent [19]

Sliker

[11] Patent Number: 4,588,005
[45] Date of Patent: May 13, 1986

[54] DUPLICATOR ATTACHMENT FOR WOODTURNING LATHES

[76] Inventor: James A. Sliker, 20 Manorshire Dr., Apt 8, Fairport, N.Y. 14450

[21] Appl. No.: 569,133

[22] Filed: Jan. 9, 1984

[51] Int. Cl.$^4$ .............................................. B23B 3/28
[52] U.S. Cl. ........................................ 142/7; 82/12; 82/14 R; 142/38; 142/55; 142/56
[58] Field of Search ................. 142/7, 38, 48, 49, 8, 142/12, 13, 15, 14, 21, 22, 24, 37, 41, 43, 55, 1, 54; 82/14 R, 12, 24 R

[56] References Cited

U.S. PATENT DOCUMENTS

| | | | |
|---|---|---|---|
| 2,068,625 | 1/1937 | Burton | 142/38 |
| 2,769,466 | 11/1956 | Brauneis | 142/7 |
| 3,204,671 | 9/1965 | Schoenrock | 142/7 |
| 3,277,933 | 10/1966 | Lalli | 142/7 |
| 3,512,561 | 5/1970 | Cortez | 82/14 R |
| 3,768,527 | 10/1973 | Messick | 142/38 |
| 3,977,279 | 8/1976 | Hooker | 82/14 R |
| 4,200,129 | 4/1980 | Sneed | 142/38 |
| 4,256,155 | 3/1981 | Hochstatter | 142/55 |

OTHER PUBLICATIONS

Toolmark Bulletin, No. 520B-1 and 3010-2, Tookmark Co., Minneapolis, Minnesota.
Bulletin of Hegner Lathe HDB200 Advanced Machiner Imports, Wilmington, Delaware.
Duplimaster Product Description from Universal Clamp Corporation.
Workbench Magazine, p. 25, Sep.-Oct. 1983.

Primary Examiner—Francis S. Husar
Assistant Examiner—Jerry Kearns
Attorney, Agent, or Firm—M. Lukacher

[57] ABSTRACT

A duplicator attachment for a woodturning lathe which provides the same freedom and control of the cutting action as in normal, freehand, turning operations, and enables duplication of inside contours, and even bowls. The duplicator also enables the pattern to be supported on the same vertical center as the workpiece and above the workpiece, rather than below or to the side of the workpiece, thereby permitting the full swing of the lathe to be used. The duplicator attachment provides a carriage to bring the cutting tool and a tracer, respectively, against the workpiece and pattern. The carriage has three sections which provide for movement of the cutting tool and tracer longitudinally along the center line of the lathe, laterally perpendicular to the center line of the lathe, and rotationally about an axis mutually perpendicular to the directions of the lateral and longitudinal movements. A handle, attached to a support member on the carriage for the cutting tool and tracer, permits manipulation simulating freehand cutting action. The carriage has a mounting which permits it to be located over the center of the bed of the lathe, as well as to the side of the lathe, thereby permitting duplicating of inner contours, as on bowls which are attached only to the driven shaft which extends from the headstock of the lathe, and requires the cutting tool to move on an axis parallel to the centerline of the machine.

18 Claims, 3 Drawing Figures

DUPLICATOR ATTACHMENT FOR WOODTURNING LATHES

DESCRIPTION

The present invention relates to duplicator apparatus, and particularly to an improved duplicator attachment for turning machines.

While the invention is especially suitable for use as a duplicator attachment for a woodturning lathe, features of the invention will be applicable wherever cutting of a workpiece to duplicate a pattern is desired.

The duplicator attachments which have been proposed either mount the cutting tool and tracer elements on a set of perpendicular ways (See U.S. Pat. Nos. 3,204,671 issued Sept. 7, 1965 and 3,277,933, issued Oct. 11, 1966) or constitute cutter and tracer holders which slide on a table mounted to the bed of the lathe (See U.S. Pat. No. 3,768,527 issued Oct. 30, 1973). The sliding duplicator is difficult to use and requires strength to maintain the sliding tool and tracer holder on the table, as well as an experienced operator to avoid breakage of parts and pattern and to maintain personal safety, since there is no restriction on the forces applied to the sliding holder from the workpiece as it revolves. Sliding duplications cannot be used on many lathes, such as multifunction (e.g., Shopsmith) type machines, because the carriage is in the way and prevents the table from being mounted to the bed. The duplicators utilizing perpendicular ways restrict the motion of the cutting tool, and do not permit the operator the freedom and control as in normal freehand turning operations. Moreover, the cutting of interior contours is difficult and impossible for some interior contours, without resetting the cutting tool just for the cutting of the interior contour. The pattern in many duplicator attachments as have been proposed must be located below the workpiece, and usually between the workpiece and the bed of the lathe. The pattern and other parts of the attachment therefore restrict the diameter of the workpiece, and does not allow the full swing of the lathe to be used. The location of the pattern on attachments using ways also prevents the location of the attachment over the bed of the lathe when inside contours, and especially bowls, are to be duplicated.

It is an object of the present invention to provide improved duplicator apparatus which is adapted to duplicate all types of patterns, regardless of the contours therein and whether mounted between centers, as on flat template holders, or only on one side as on the driven shaft which extends from the headstock of the lathe.

It is a further object of the invention to provide improved duplicator apparatus which provides normal turning action as in freehand turning operations.

It is a still further object of the present invention to provide improved duplicator apparatus useful with a multifunction cutting machine using a carriage which is moveable longitudinally on the ways of the machine, as well as in lathes having fixed headstocks.

It is a still further object of the present invention to provide improved duplicator apparatus which is positionable directly over the centerline of the bed of the lathe to enable duplicating of inside contours, and even bowls.

It is a still further object of the present invention to provide improved duplicator apparatus which enables precise location of the cutting tool and precise alignment of the cutting tool and the pattern follower or tracer.

It is a still further object of the present invention to provide improved duplicator apparatus which does not restrict the size of the work or the pattern, the only restriction being that of the turning machine, for example, the swing of the lathe.

Briefly described, duplicator apparatus embodying the invention is adapted to cut a workpiece, to form the contours of a pattern, on a lathe. The apparatus utilizes a carriage supporting the cutting tool which cuts the workpiece and a tracer which follows a pattern. The carriage has a plurality of sections, respectively mounted for linear motion in transverse directions and for rotational motion. Means are attached to the carriage for conjointly moving the sections to provide linear motions in transverse directions with rotational motion so as to enable the tracer to follow inside as well as outside the contours of the pattern while the tool cuts the workpiece to duplicate the contours.

The foregoing and other objects, features and advantages of the invention as well as a presently preferred embodiment thereof will become more apparent from a reading of the following description in connection with the accompanying drawings in which.

Figure 1:
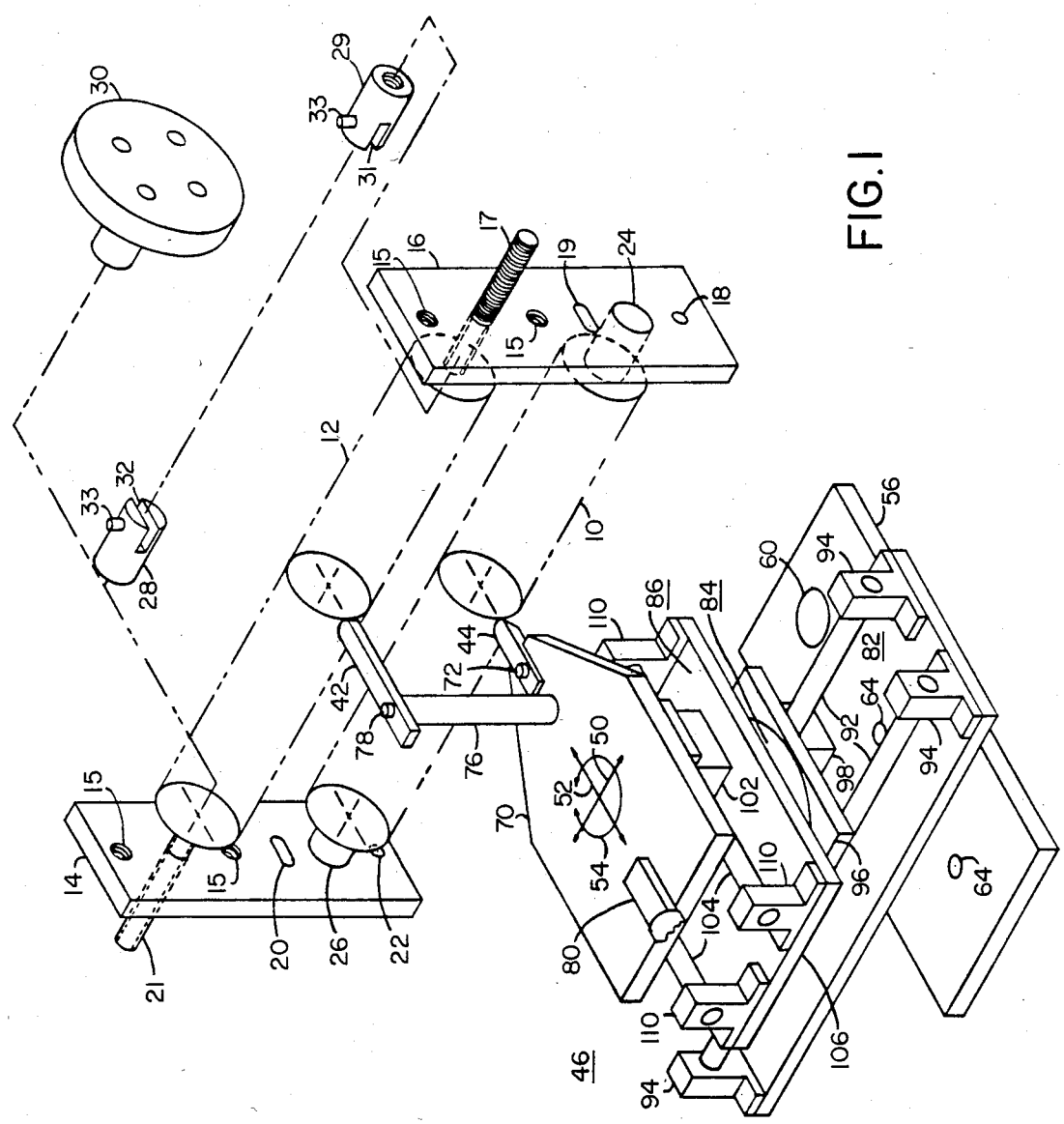
FIG. 1 is a perspective view, diagramatically illustrating a duplicator attachment in accordance with a preferred embodiment of the invention.

Referring to the drawings, there is shown in FIG. 1, in outline form, a workpiece 10 and a pattern 12. The workpiece may be a block of wood to be turned. The pattern 12 may be a master, for example the first of several legs required for a table. The pattern may be a section which describes the contours to be duplicated in the workpiece. A typical master is shown in the above-referenced U.S. Pat. No. 3,204,671. Sectional patterns are shown in the above-referenced patents U.S. Pat. Nos. 3,277,933 and 3,768,527. Mounting brackets 14 and 16 may be secured respectively to the head stock and tail stock of the lathe or to the bed of the lathe. Openings and slots 18, 19, 20 and 22 may be used to align the brackets 14 and 16 so that they stand upright in vertical planes perpendicular to the bed of the lathe.

Openings 24 and 26 in the brackets 14 and 16 enable the lathe centers to pass through the brackets 14 and 16. The usual pronged end of the drive shaft of the lathe extends through the opening 26 in the bracket 14 into driving relationship with the workpiece 10. Accordingly, the workpiece is mounted along the center line of the lathe which passes longitudinally through the lathe centers. The master or pattern 12 is fixedly secured to the brackets 14 and 16 above the workpiece 10 by means of threaded centers 17 and 21 which are located in the brackets 14 and 16 and allow for vertical and longitudinal positioning of the pattern over the workpiece. The pattern 12 lies in a vertical plane perpendicular to the bed of the lathe which passes through the center line of the lathe. The mounting of the pattern 12 above the workpiece enables the full swing (maximum radius of rotation between the lathe center line and the bed of the lathe) to be used. Brackets with a plurality of vertical holes may be used depending upon the size (the largest diameter) of the pattern.

Template holders 28 and 29 may be attached to the pattern centers 21 and 17, respectively, to allow for duplicating a flat pattern made of wood or metal. The flat template is located in slots 31 and 32 and secured by use of set screws 33.

For bowl or face plate turning, a face plate 30 is mounted to the pattern center 21 located in the headstock bracket 14. The workpiece is attached to the driven shaft of the headstock utilizing a similar face plate, with a conventional glue joint for example.

Figure 2:
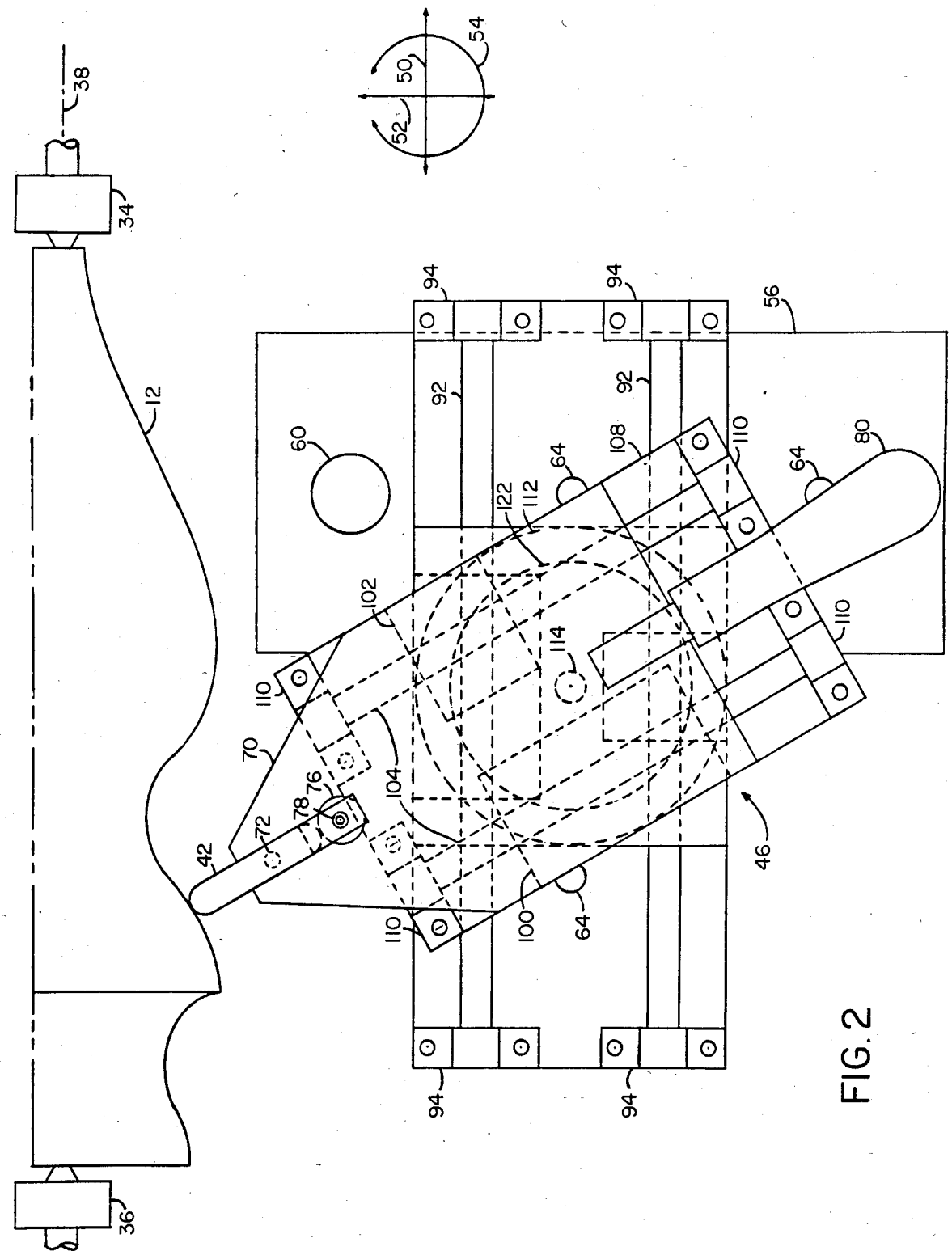
FIG. 2 is a plan view of the duplicator attachment shown in FIG. 1.
Figure 3:
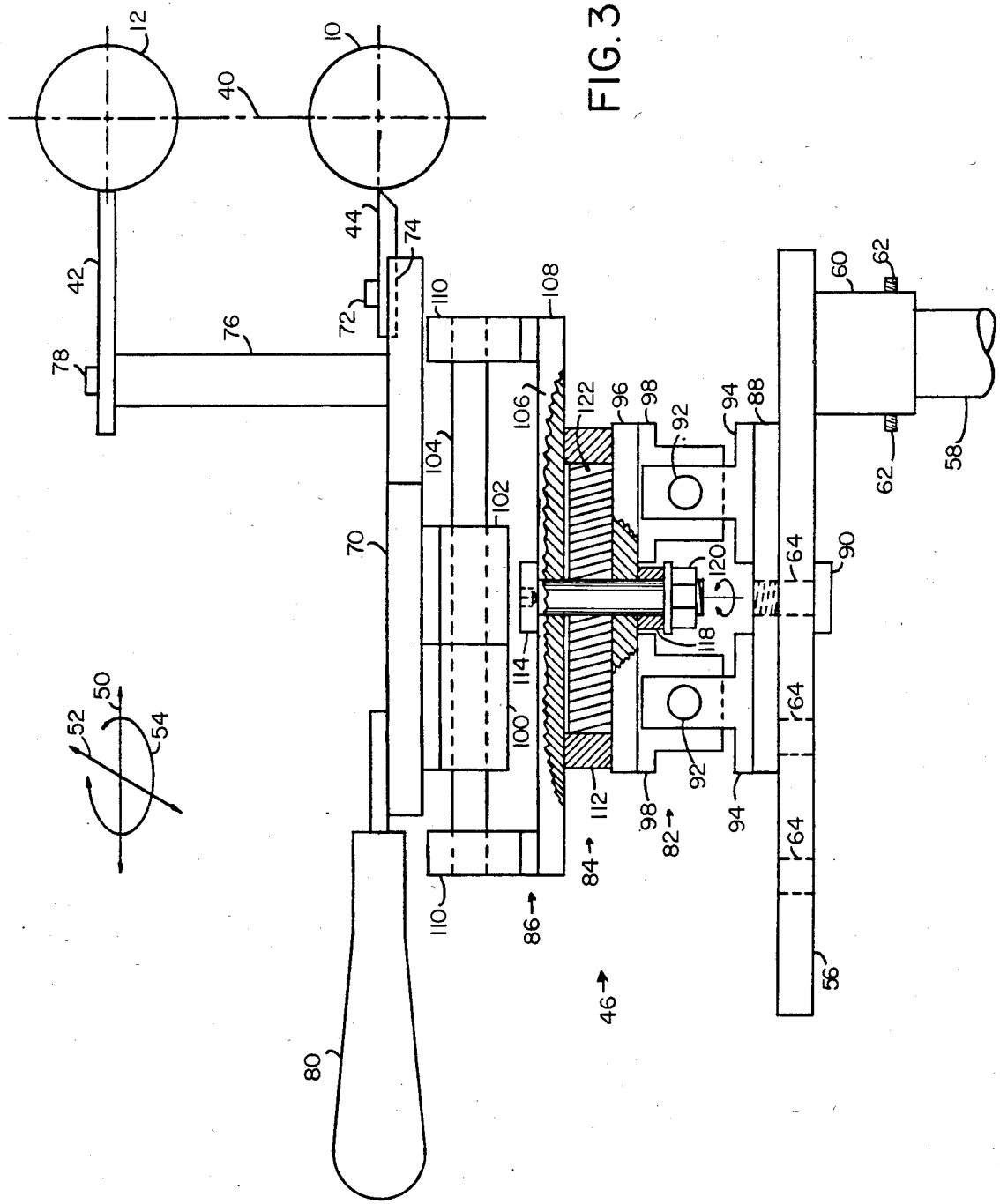
FIG. 3 is a side view, partially in section, of the duplicator attachment shown in FIG. 2.

The lathe centers 34 and 36 are shown in FIG. 2. The lathe center line is shown at 38 in FIG. 2. The vertical plane perpendicular to the bed of the lathe is shown at 40 in FIG. 3.

The pattern 12 is traced by a tracer 42 while the workpiece is cut by a cutting tool 44. The cutting tool 44 and tracer are disposed in vertical alignment spaced from each other with a spacing distance corresponding to the distance between the centerlines of the workpiece 10 and the pattern 12. The tool 44 and tracer 42 are mounted on a carriage 46 which enables conjoint movement of the tool 44 and tracer 42 linearly in transverse directions along the center line of the lathe and perpendicular to the center line. These linear directions are perpendicular to each other as shown by the arrows 50 and 52. Rotational movement, shown by the arrows on the circular line 54, about an axis perpendicular to the directions of linear motion, is also provided in the carriage 46.

The carriage is supported on an arm 56 which may be mounted on the tool post which is attached to the carriage of a multi-function machine, such as the "Shop Master", the tool post 58 is received in a sleeve 60 depending from the support arm 56. The support arm may be rotated about the post 58 and clamped in place by set screws 62. The support arm may also be attached directly to the bed of the lathe, for example, by mounting brackets which are clamped to the ways in the lathe. The support arm 56 also has a plurality of holes 64 longitudinally spaced along it to which the carriage 46 may be attached. Accordingly, the carriage may be located at selected positions inside or outside the bed of the lathe. Location of the carriage 46 inside the bed of the lathe is especially desired when duplicating bowls.

The carriage has a support member or plate 70 which is disposed in a horizontal plane perpendicular to the vertical plane 40 through the lathe centerline. The cutting tool 44 is attached by a screw 72 to the support member 70 and is preferably located in a groove 74 at the end of the member 70 which faces the work piece 10. The tracer 42 is mounted on a post 76 having its axis perpendicular to the support member 70. A screw 78 permits rotational and linear adjustment of the tracer 42 to bring it into alignment with the cutting tool 44. A handle 80 is attached to the support member 70 at the rear end thereof which is opposite to the end to which the cutting tool 42 and tracer 44 are attached. The handle permits manipulation of the carriage 46 so as to carry out the conjoint longitudinal, lateral and rotational movement in three sections 82, 84 and 86 which make up the carriage 46, thereby enabling the cutting tool 44 and tracer 42 to carry out conjoint linear, lateral, and rotational motion under control of the operator who manipulates the handle 80.

The first section 82 has a base plate 88 which is attached to the support arm 56 by a mounting bolt 90. Rails 92, which are polished shafts, are mounted parallel to each other on supports 94. These rails 92 define the linear, longitudinal direction of movement of the carriage 46. A platform plate 96 has linear bearings 98 depending therefrom. The rails 92 pass through these bearings and support the platform 96.

In the section 86 of the carriage 46, the support member 70 is carried on linear bearings 100 and 102, the latter of which may be shorter, and acts as a guide bearing. Rails 104 in the form of polished shafts define the linear, lateral direction of movement of the carriage 46. The rails 104 extend through these linear bearings 100 and 102. The rails are supported in a cradle 106 made up of a cradle plate 108 and rail support members 110.

The middle section 84 rotatably supports the upper section 86 on the lower section 82. This middle section 84 utilizes a ring thrust bearing 112, which may be a commercial bearing utilizing barrel or similar rollers. This bearing is sandwiched between the cradle plate 108 and the platform plate 96 held in place by a shoulder bolt 114 and spacer 122 (see FIG. 3). The bolt 114 is rotatably supported by a thrust bearing 118, which is held in place against the platform 96 by a nut 120 on the threaded end of the bolt 114. The spacer 122 is in the form of a disc having a center hole larger in diameter than the diameter of the bolt 114, and locates the thrust bearing 112 laterally between the cradle 106 and the platform 96.

In operation, the handle 80 is manipulated, much like a chisel in free-hand, normal turning operations, to direct the tracer and cutting tool conjointly. The ability to carry out linear, lateral and longitudinal movements as well as rotational movement enables inside contours to be cut without any adjustment of the duplicator attachment. The duplicator provides a firm support for the cutting tool and tracer which enhances the safety in operation. By changing the height of the post 76 with the size of the pattern, diameters as large as the full swing of the lathe can be accommodated and large parts may be duplicated. The pattern centers 17 and 21 are also moved upward and located in holes 15 positioned at various vertical centerlines in the brackets 14 and 16. Bowl work may readily be accomplished by simply positioning the carriage 46 over the bed of the lathe utilizing the moveable arm 56.

From the foregoing description it will be apparent that there has been provided improved duplicator apparatus especially suitable for use with wood turning lathes. While a preferred embodiment has been described, variations and modifications, within the scope of the invention, will undoubtedly suggest themselves to those skilled in the art. Accordingly, the foregoing description should be taken as illustrative and not in a limiting sense.

I claim:

1. Apparatus for carrying a cutting tool and tracer for cutting a work piece to form contours of a pattern on a cutting machine on which the work piece is rotated, which apparatus comprises a carriage having a support member supporting the cutting tool which cuts the work piece and the tracer which follows the pattern, said carriage having a plurality of sections mounted to each other respectively for linear motion in mutually transverse directions and for rotational motion, and means attached to said support member for manipulation by an operator to enable simultaneous controlled conjoint movement of said sections with said linear motion in both said transverse directions and with said rotational motion to enable said tracer to follow inside as well as outside contours of said pattern while said tool cuts said work piece.

2. The apparatus according to claim 1 wherein one of said linearly moveable sections is mounted to the other of said linearly moveable sections by said rotationally moveable section.

3. The apparatus according to claim 2 where one of said linearly moveable sections is mounted for movement longitudinally along the center line of said machine and the other of said linearly moveable sections is mounted for lateral movement toward and away from a plane through the center line of said machine, said rotationally moveable section being disposed between said longitudinally and laterally moveable sections.

4. The apparatus according to claim 1 wherein said means for moving said carriage is coupled to all of said sections for providing said transverse linear and said rotational motions of said sections and conjoint transverse linear and rotational motion of said tracer and cutting tool.

5. The apparatus according to claim 4 wherein one of said linearly, transversely moveable sections is rotatably mounted to the other of said linearly transversely moveable sections by said rotatably moveable section, means for connecting the tracer and cutting tool to said one section, and said means for controlled conjoint movement said sections being a handle connected to said one section to effect the conjoint linear motions in transverse directions and the rotational motion of said tracer and cutting tool.

6. The apparatus according to claim 1 wherein said machine is a lathe and further comprising a support arm, said carriage being mounted on said arm, and means for moveably mounting said arm to said lathe to selectively locate said carriage in positions inside and outside the bed of said lathe.

7. The apparatus according to claim 1 wherein said machine is a lathe and further comprising means for mounting the workpiece in driving relationship with the drive means of said lathe along the center line of said lathe and for mounting said pattern above said workpiece spaced out of interfering relationship with said workpiece.

8. The apparatus according to claim 7 wherein said carriage has a support for said cutting tool and said tracer mounted thereon for movement in a horizontal plane perpendicular to a vertical plane through the lathe center line, said mounting means supporting said pattern above said workpiece in said vertical plane, a post on said support for said cutting tool mounting said tracer spaced vertically above said cutting tool and spaced therefrom a distance corresponding to the distance between said workpiece and said pattern.

9. A duplicator attachment for use with a turning lathe having a bed and a drive head which rotates a workpiece about the center line of said lathe to enable cutting of a duplicate of a pattern, said duplicator attachment comprising a support arm mounted in a horizontal plane to said lathe, a support member also disposed in a horizontal plane and spaced from said arm for carrying a tool for cutting said workpiece and a tracer for tracing said pattern in aligned relationship thereof, a carriage on said arm having first, second and third sections, said first and second sections having said arm and said support member respectively connected thereto, one of said first and second sections having means responsive to the movement of said support member for enabling movement of said support member in a longitudinal direction along the lathe center line, the other of said first and second sections having means also responsive to the movement of said support member for enabling movement of said support member in a lateral direction perpendicular to the lathe ceter line, said third section being disposed between said first and second sections and being movable therewith and rotatably mounting said second section on said first section for rotation about a vertical axis mutually perpendicular to said longitudinal and lateral directions, and means on said support member for manipulation by an operator to enable simultaneous controlled conjoint movement of said cutting tool and tracer laterally, longitudinally and rotationally.

10. The duplicator attachment according to claim 9 further comprising means for mounting said workpiece and pattern over the bed of the lathe with said pattern and said workpiece along a vertical plane and said pattern above said workpiece.

11. The duplicator attachment according to claim 9 further comprising means for selectively locating said arm for bringing said arm and said carriage thereon over the bed of said lathe.

12. The duplicator attachment according to claim 9 further comprising means for mounting said carriage on said arm at a plurality of selected positions spaced longitudinally along said arm.

13. The duplicator attachment according to claim 9 wherein said first and second sections each include rails, said first section having a platform, and bearings on said first section rails moveably supporting said platform, said second section having a cradle supporting the rails thereof, bearings moveably supporting said support member on the rails of said cradle, and said third section including thrust bearing means between said platform and said cradle.

14. The duplicator attachment according to claim 13 wherein said thrust bearing means comprises a bolt extending through said cradle and said platform, means rotatably mounting said bolt in said cradle and platform, a spacer around said bolt between said cradle and platform, and a thrust bearing ring around said spacer sandwiched between said cradle and said platform.

15. The duplicator attachment according to claim 14 wherein said means rotatably mounting said bolt comprises a nut on the end of said bolt extending through said platform, and another thrust bearing ring around said bolt between said platform and said nut.

16. The duplicator attachment according to claim 9 wherein said manipulating means comprises a handle extending from the end of said support member opposite to the end thereof from which said cutting tool extends.

17. The duplicator attachment according to claim 9 further comprising means for mounting said cutting tool horizontally in said support member at the end thereof facing said workpiece.

18. The duplicating attachment according to claim 17 further comprising a post mounted with its axis vertical on said support member, and means for mounting said tracer horizontally on said post in alignment with said cutting tool.

* * * * *